(12) United States Patent
Steinbock et al.

(10) Patent No.: US 8,641,340 B1
(45) Date of Patent: Feb. 4, 2014

(54) CARGO NETTING SYSTEM

(75) Inventors: Zachary L. Steinbock, Philadelphia, PA (US); Sean M. Matson, Virginia Beach, VA (US)

(73) Assignee: Matbock, LLC, Virginia Beach, VA (US)

( * ) Notice: Subject to any disclaimer, the term of this patent is extended or adjusted under 35 U.S.C. 154(b) by 33 days.

(21) Appl. No.: 13/350,378

(22) Filed: Jan. 13, 2012

(51) Int. Cl.
*B60P 7/06* (2006.01)

(52) U.S. Cl.
USPC .......................................................... 410/97

(58) Field of Classification Search
USPC ..................................................... 410/77, 97
See application file for complete search history.

(56) References Cited

U.S. PATENT DOCUMENTS

| | | | | |
|---|---|---|---|---|
| 5,193,955 | A * | 3/1993 | Chou | 410/100 |
| 5,458,447 | A * | 10/1995 | Clason | 410/100 |
| 6,142,727 | A * | 11/2000 | Beale | 414/814 |
| 6,209,768 | B1 * | 4/2001 | Boaz | 224/314 |
| 6,834,651 | B1 * | 12/2004 | Murdock et al. | 128/845 |
| 6,851,903 | B1 * | 2/2005 | Foggy | 410/118 |
| 8,292,559 | B1 * | 10/2012 | Foggy | 410/96 |

* cited by examiner

*Primary Examiner* — H Gutman
(74) *Attorney, Agent, or Firm* — Middleton Reutlinger; Alexander P. Brackett

(57) ABSTRACT

The present invention is a single piece cargo net having a semi-rigid center section for centering, and includes a pair of opposed short side sections having a plurality of spaced vertical straps extending from the center section. The invention further includes a pair of opposed long side sections having a plurality of spaced vertical straps extending from said center section. The invention further includes an integral storage bag that easily opens and separates for deploying the single piece net.

9 Claims, 9 Drawing Sheets

CARGO NETTING SYSTEM

FIELD OF THE INVENTION

The present invention relates generally to a cargo netting system and more particularly to a system and method of securing cargo to a shipping platform comprising a single-piece net having a plurality of shaped sides for quickly and efficiently covering and securing said cargo to the platform.

BACKGROUND OF THE INVENTION

Prior art cargo tie-down systems, specifically those commonly utilized by the U.S. Military, are typically comprised of three nets which are secured together utilizing a plurality of hooks and buckles. These prior art cargo netting systems are designed to meet the current specifications set forth by the U.S. Military Specification MIL-N-27444C (USAF). This "MIL SPEC" sets forth a color scheme for the webbing used in these prior art systems (olive drab for the sides (type 1) and yellow for the top (type 2)), and further specifies a maximum stack height and load for type 1 and 2 webbing system.

However, the prior art cargo net tie-down systems produced to comply with the aforementioned MIL-SPEC, as well as many other commercially available net tie-down systems suffer from a variety of disadvantages that make them difficult to use. Initially, the netting assembly of these prior art systems is quite complex, typically employing two side nets and a top net that must be aligned over the cargo container in a specific orientation before the nets can be properly secured together, and only then secured over the cargo to secure the cargo to the shipping platform.

Additionally, prior art cargo netting systems are often difficult to deploy over cargo because of the very complex configuration of a plurality of interrelated nets. The nets typically permit any size cargo to be loaded onto the pallet, however, only the top net is usually needed for very small loads, thereby necessitating that the user attempt to bundle up and secure the remaining nets for loads that don't require the entire dimensions of the netting. The side nets are needlessly complex because most pallets or cargo platforms are not square, so each side net typically is rectangular in shape. Often a user will attempt to secure cargo having attached the long side of a side net to the short side of the load by mistake. Of course, this requires the entire system to be reoriented before the load can be secured.

Accordingly, many prior art cargo net systems can almost be completely assembled in an improper orientation, thereby causing great loss of time and effort. This problem is particularly vexing where time is of the essence, as is often the case in military operations. Furthermore, many prior art systems don't allow for the load to be tightly compressed on the corners because the attachments utilized on the webbing ends have little or no mechanical advantage.

Based on the foregoing it is apparent that there is a significant need in the art for a cargo netting tie-down system for securing a load to a platform that is readily properly oriented, simple to deploy, and quick to secure that overcomes the problems readily apparent in the prior art.

BRIEF DESCRIPTION OF THE DRAWING FIGURES

DETAILED DESCRIPTION OF THE PREFERRED EMBODIMENT(S)

Figure 3:
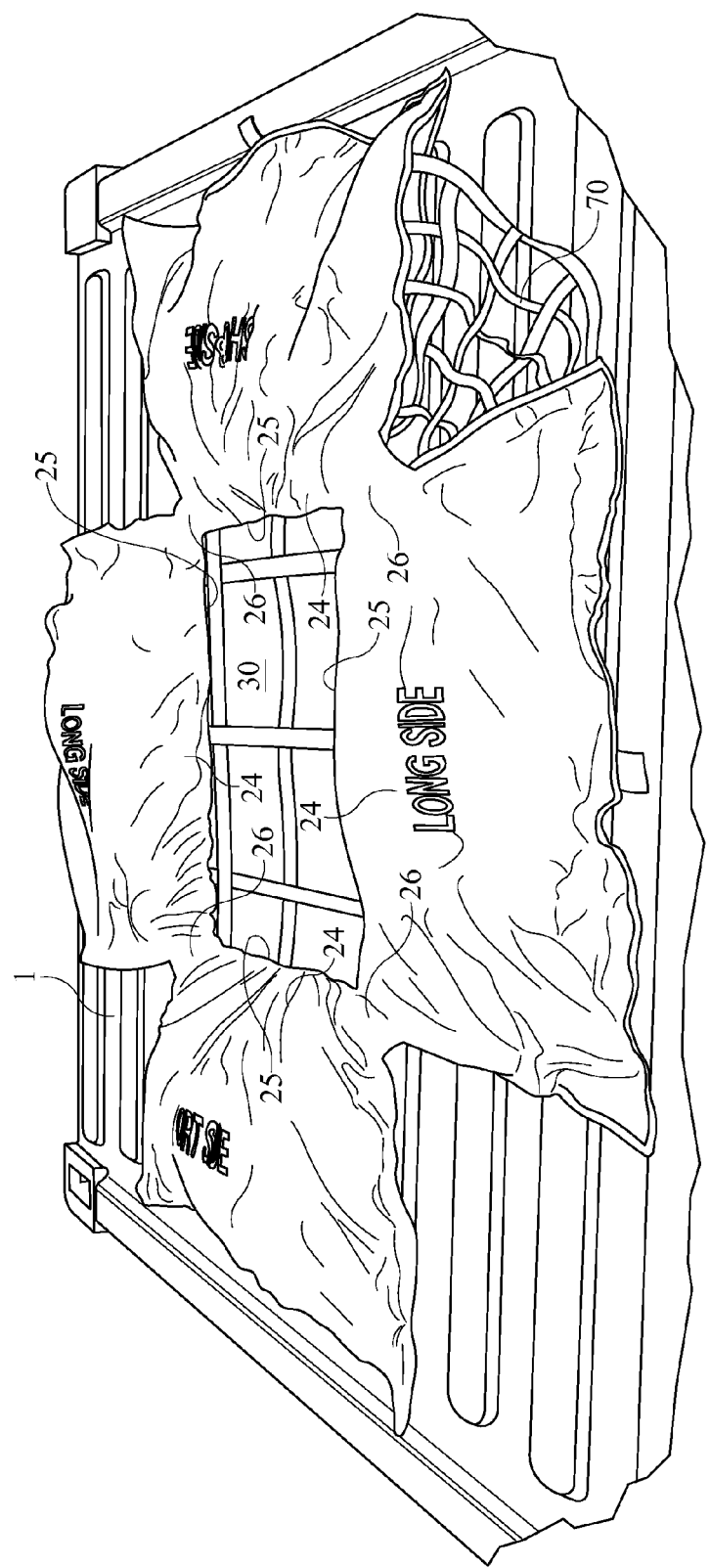
FIG. 3 is a perspective view of a partially opened cargo netting system deployed on a top surface of said cargo in accordance with one embodiment of the present invention.
Figure 4:
FIG. 4 is a partial perspective view of a deployed cargo netting system in accordance with one embodiment of the present invention.
Figure 5:
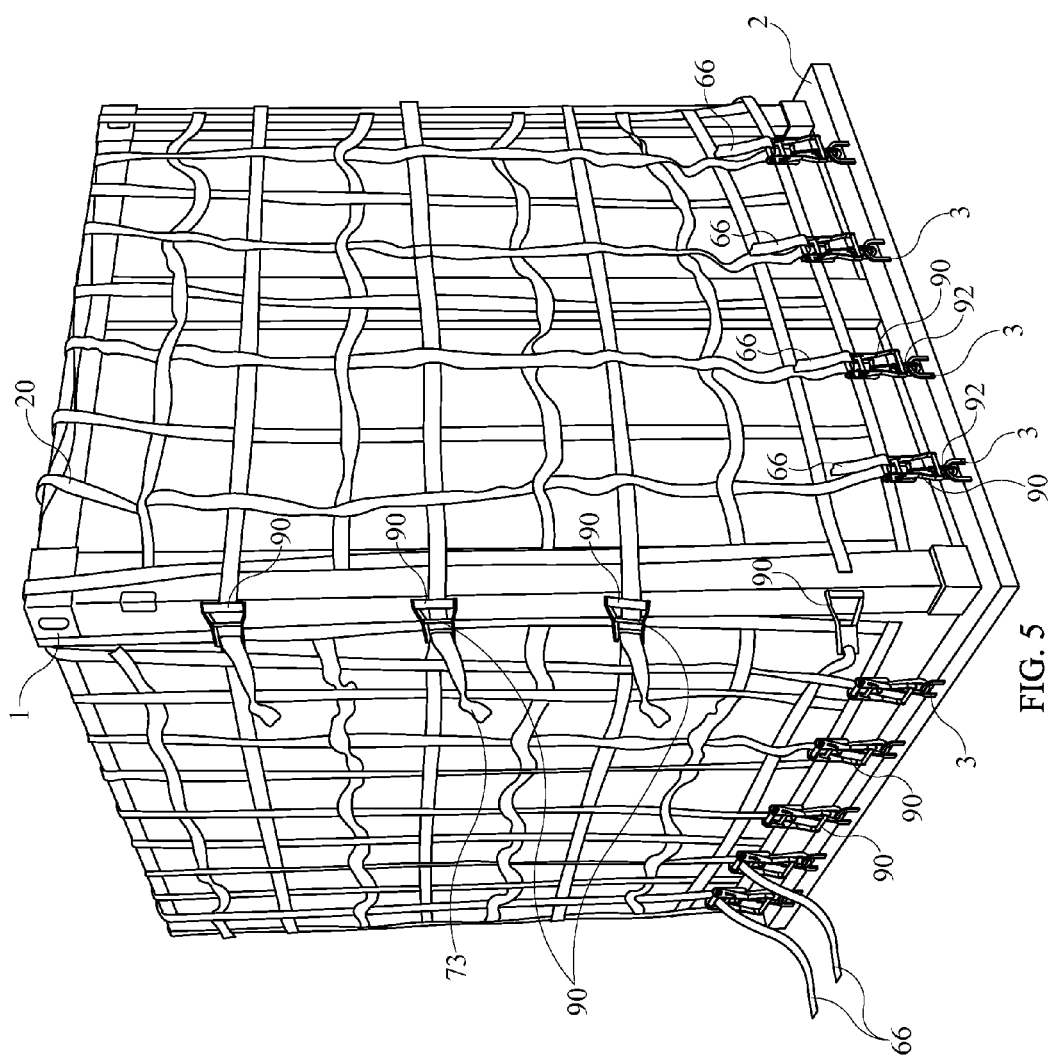
FIG. 5 is a perspective view of a deployed cargo netting system in accordance with one embodiment of the present invention.

Referring now to FIGS. 1-9, and in accordance with a preferred constructed embodiment of the present invention, a system 10 for securing a cargo 1, or the equivalent thereof, to a shipping platform 2 comprises a single-piece net 20 having a center section 30 to which a central portion 22 of single piece net 20 is secured for storing and orienting system 10. While system 10 is shown in use securing cargo 1 that is depicted as a cargo box, system 10 may be employed to secure a wide variety of cargos 1 without departing from the scope of the present invention. Furthermore, shipping platform 2 is depicted in FIG. 5 as a pallet 2 having a plurality of tie-down eyes 3 secured thereto at a plurality of points around its perimeter. Shipping platform 2 may comprise a wide variety of platforms to which cargo 1 may be secured without departing from the scope of the invention.

Figure 1:
FIG. 1 is a perspective view of a partially stowed cargo netting system deployed on a top surface of said cargo in accordance with one embodiment of the present invention.
Figure 2:
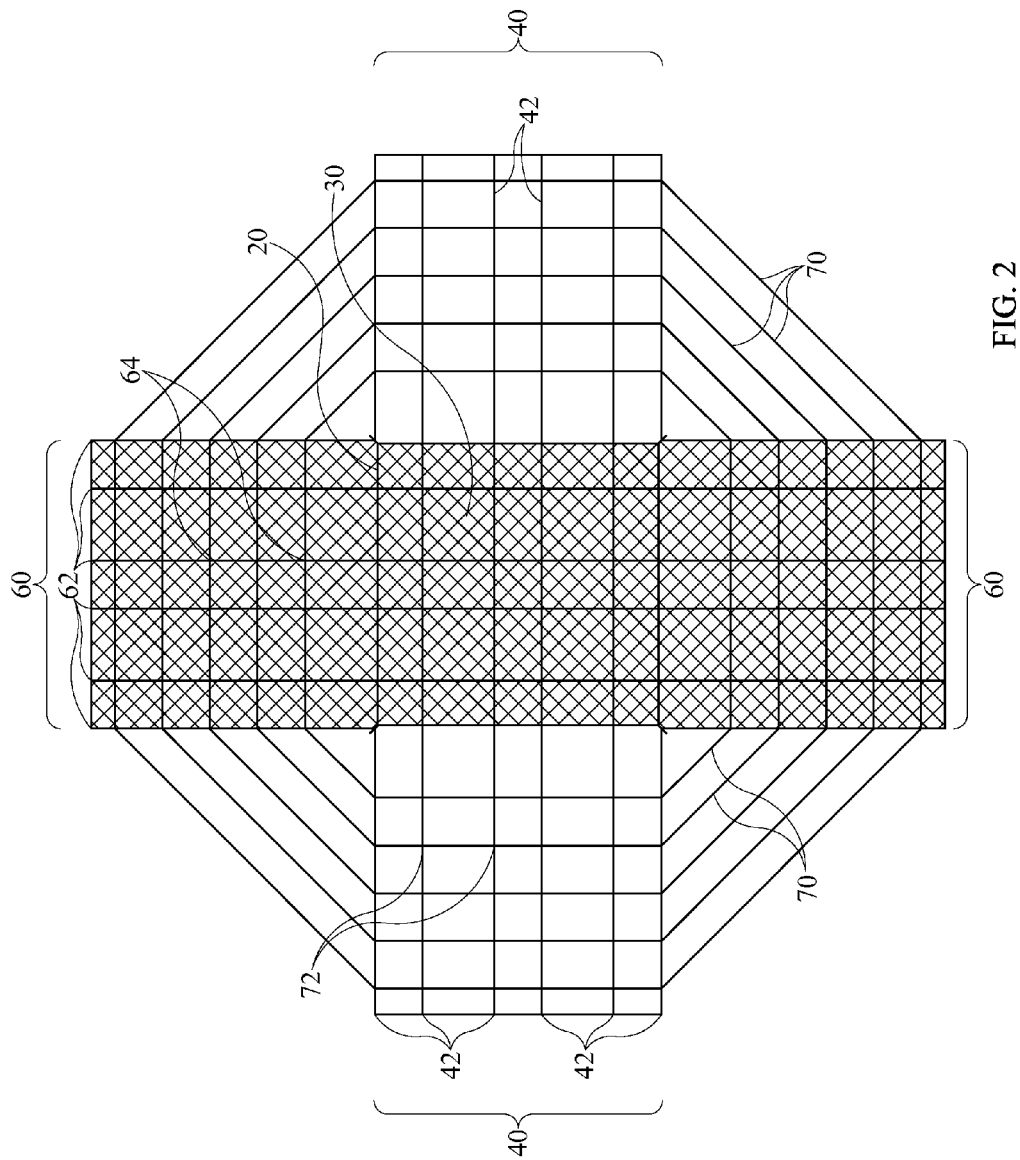
FIG. 2 is an overhead schematic view of a fully opened and flattened cargo netting system in accordance with one embodiment of the present invention.

As best seen in FIGS. 1, 3 and 4, center section 30 may comprise a rigid or semi-rigid weatherproof material, such as Plexiglas or an equivalent durable plastic, that is generally resistant to ambient weather conditions and rough handling. A wide variety of materials such as woods, metals, and plastics may be employed in the construction of center plate 30 of single piece net 20 without departing from the scope of the present invention. In one embodiment of the invention, central portion 22 of net 20 is sewn or bonded to center section 30 at a plurality of locations to secure net 20 thereto, thereby providing a system 10 that has a readily located and positioned center for rapidly orienting system 10 on cargo 1.

FIGS. 1, 3 and 4 depict a plurality of storage bags 24, capable of containing and securing opposed sides of single piece net 20, as will be discussed herein below. Storage bags 24 each have apertures or channels 26 at upper sides thereof proximate center section 30, to permit horizontal straps to be routed between adjacent storage bags 24, even as the storage bags contain the remaining portions of single piece net 20. As seen in the drawing Figs. opposed storage bags 24 are marked "long side" and "short side" respectively, to assist the user in properly orienting system 10 over a cargo 1. Furthermore, storage bags 24, at a top edge 25 thereof, are each individually secured to center section 30, thereby preventing their loss or improper storage. When net 20 is deployed, storage bags 24 simply remain in place until they are needed to store single piece net 20 once again.

Alternatively, storage bags 24 may comprise upper and lower flaps 28 that are secured together and secured to center section 30 at an upper portion thereof. Upper and lower flaps 28 are secured together around their perimeters by operation of a plurality of fasteners or the equivalent, to create storage bags 24, thereby enclosing the opposed sides of single piece net 20. Furthermore, channels 26 also include perimeters that have a plurality of fasteners thereon, whereby storage bags 24 can be "connected" by channels 26 to form one continuous enclosure for single piece net 20. In one exemplary embodiment of the invention, upper and lower flaps 28 are secured together around their perimeters by a hook and loop fastener 29 (such as Velcro, for example) secured around the perimeter edges of flaps 28 to provide a simple to assemble storage bag that is also opened and deployed rapidly. In this embodiment of the invention, chanels 26 proximate center section 30 may be created by securing the hook and loop fasteners of upper and lower flaps 28 at those points.

Referring now to FIGS. 2-6, single piece net 20 comprises a pair of opposed short sides 40, having a plurality of spaced vertical straps 42 extending from center section 30. Short sides 40 are advantageously stored in "short side" storage bags 24. Similarly, single piece net 20 also comprises a pair of opposed long sides 60, having a plurality of spaced vertical straps 62 extending from center section 30. Again, long sides 60 are stored in "long side" storage bags 24. The dimensions of short sides 40 and long sides 60 may be modified to customize system 10 depending upon the range of cargo 1 sizes being secured without departing from the scope in the invention.

Spaced vertical straps 42, 62 include a plurality of vertically oriented slots or loops 64 spaced along their lengths, for slidably engaging a plurality of spaced horizontal straps 70 that form a further part of single piece net 20. In a complementary fashion, spaced horizontal straps 70 also comprise a plurality of horizontally oriented slots or loops 72 for slidably engaging spaced vertical straps 42, 62. Additionally, it should be noted that spaced horizontal straps 70 have terminal ends 73 for securing single piece net 20 tightly around cargo 1, as discussed further herein below.

Figure 6:
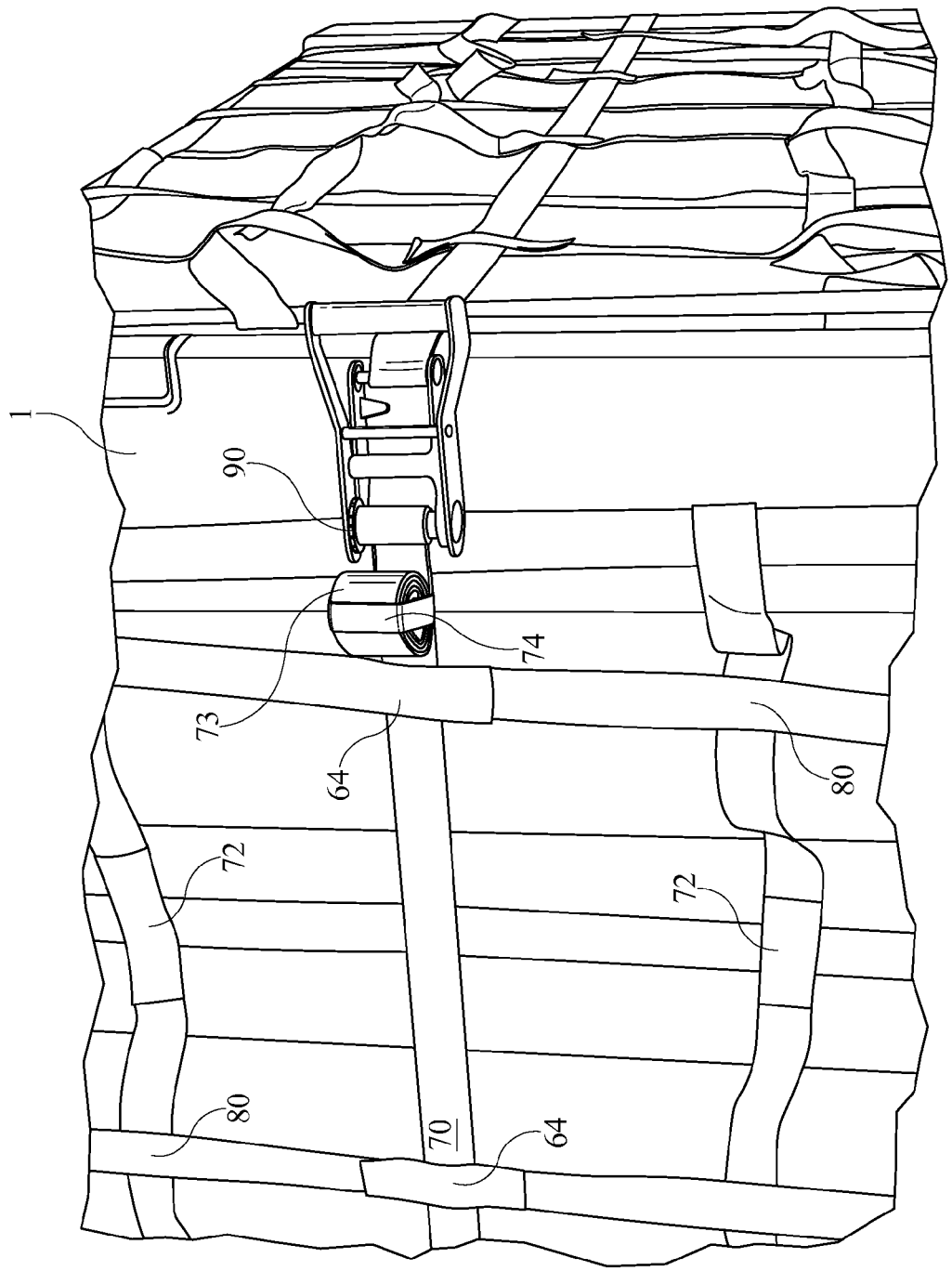
FIG. 6 is a detail view of a ratchet strap for tightening the cargo netting system around said cargo in accordance with one embodiment of the present invention.
Figure 7:
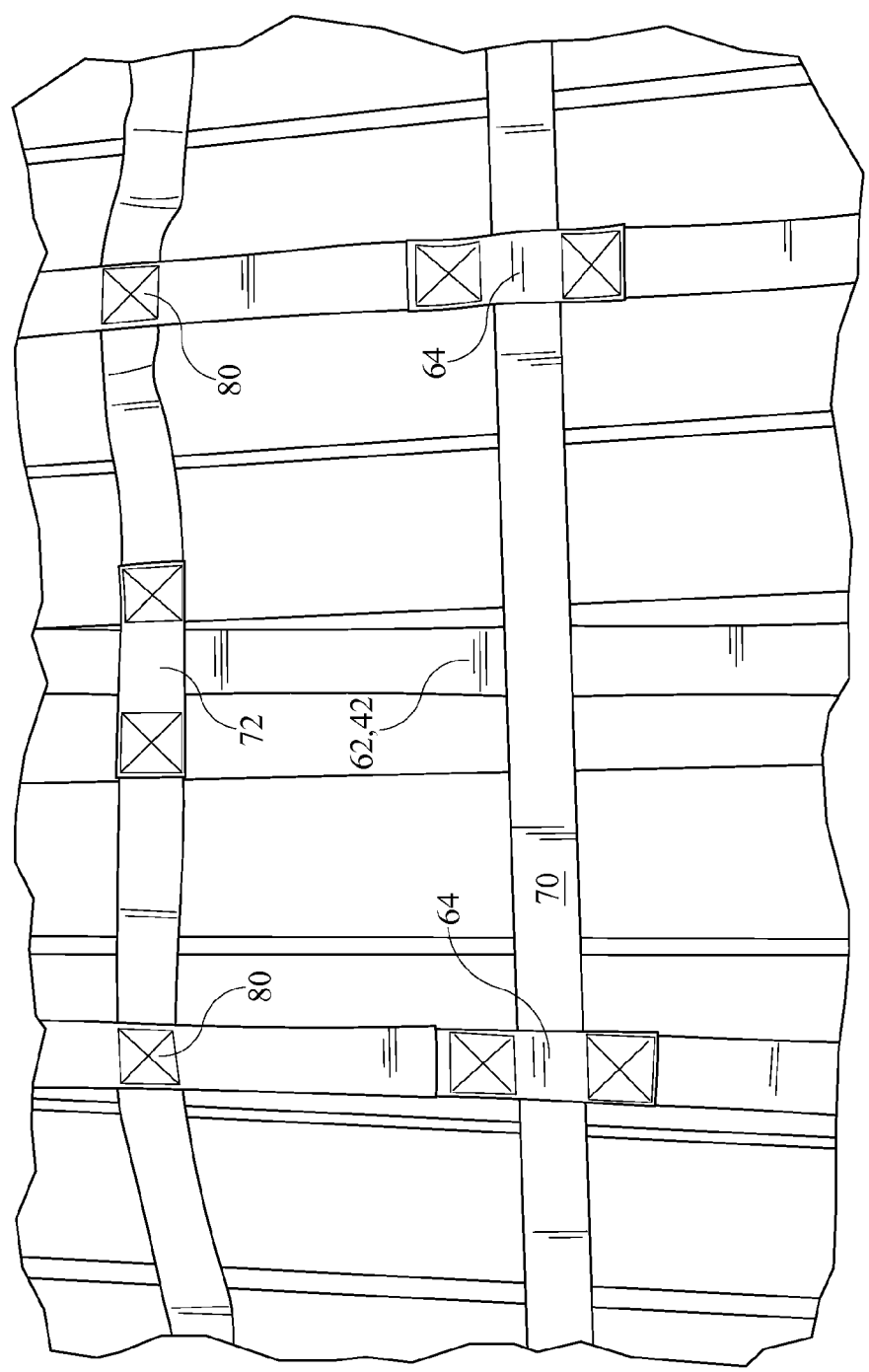
FIG. 7 is a detail view of a plurality of orthogonal netting connections in accordance with one embodiment of the present invention.

As readily seen from the drawing Figures, particularly FIG. 6 loops 64 and 72 provide a cargo net having a plurality of intersecting yet movable horizontal 70 and vertical 42, 62 straps that are readily adjusted to a plurality of cargo sizes since straps 42, 62 and 70 are movable with respect to each other. In a yet further embodiment of the invention, straps 42, 62 and 70 may be secured together, either by sewing, integral manufacture, or other equivalent manufacturing technique, at a plurality of points 80 around single piece net 20, thereby providing a plurality of fixed points where straps 42, 62 and 70 are secured together to form a single piece net 20 while maintaining flexibility in its deployment and arrangement around cargo 1.

As best seen in FIGS. 5 and 6, system 10 further comprises a plurality of ratchets 90 having hooks 92 thereon for securing system 10 tightly to a shipping platform. Vertical straps 40, 60 have terminal ends 66 that are engaged by ratchets 90, whereby ratchet hook 92 is secured to shipping platform 2 tie-down eyes 3, or a point on cargo 1, and ratchet 90 is used to tighten vertical straps 40, 60 around cargo 1. Ratchets 90 may comprise one of many commercially available ratchets for tightening webbing straps without departing from the scope of the present invention.

In a similar fashion, a plurality of horizontal strap 70 terminal ends 73 are engaged by ratchets 90, thereby tightly securing horizontal straps around cargo 1. FIG. 5 depicts a fully deployed and system 10 secured over cargo 1, ready to be tightened by use of ratchets 90. As readily seen, system 10 may be quickly and efficiently adjusted to tightly secure cargo 1 within single piece net 20 to shipping platform 2. Furthermore, it should be noted that not every horizontal strap 70 need include a ratchet 90. In other words, a plurality of horizontal straps 70 may have terminal ends 73 engaged by ratchets 90, while a plurality of horizontal straps 70 are continuous, having no terminal ends 73 at all. Terminal ends 73 of horizontal straps 70 may be rolled or folded up and secured to straps 70 by use of tie-down bands 74, which may comprise elastic bands positioned around straps 70 at a plurality of points.

Figure 8:
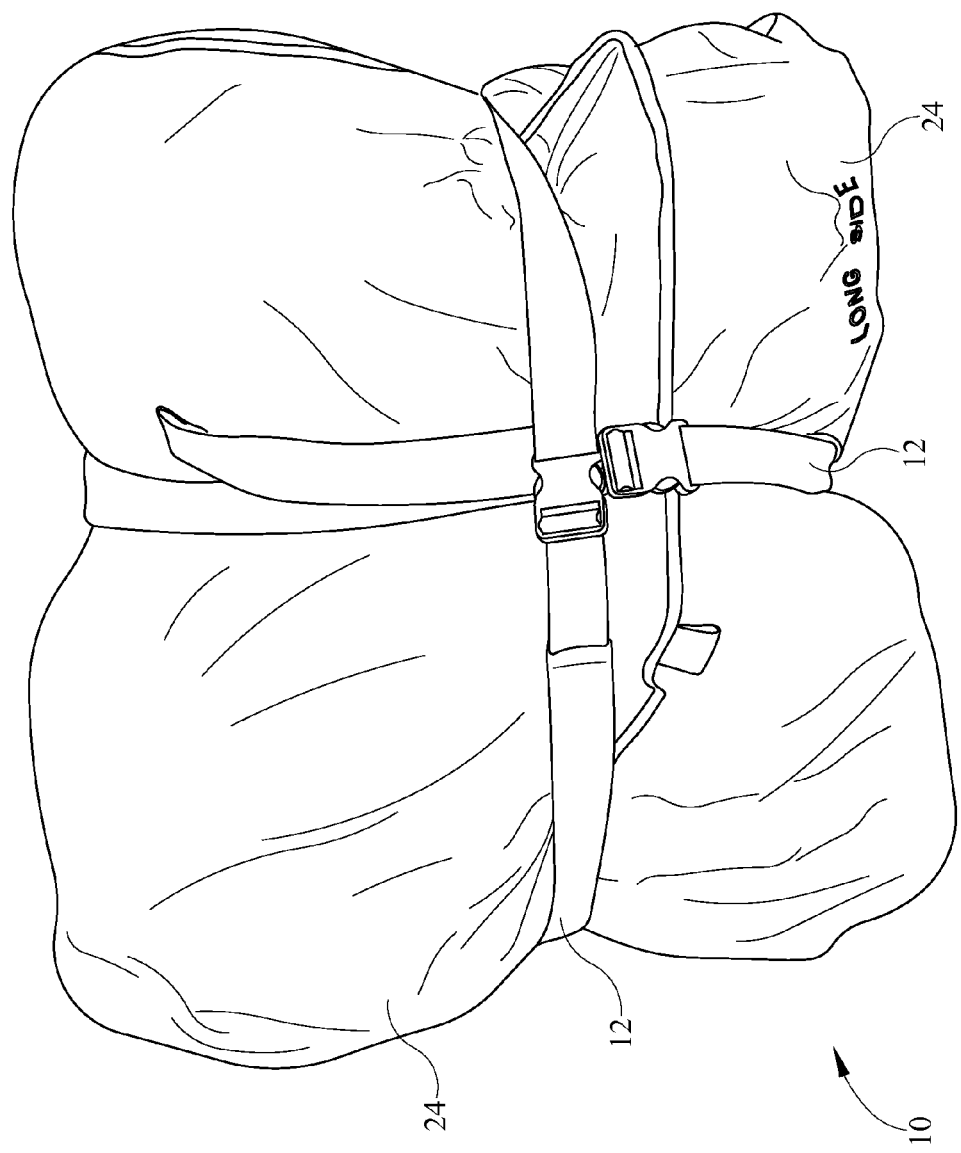
FIG. 8 is a front perspective view of a fully stowed cargo netting system in accordance with one embodiment of the present invention.
Figure 9:
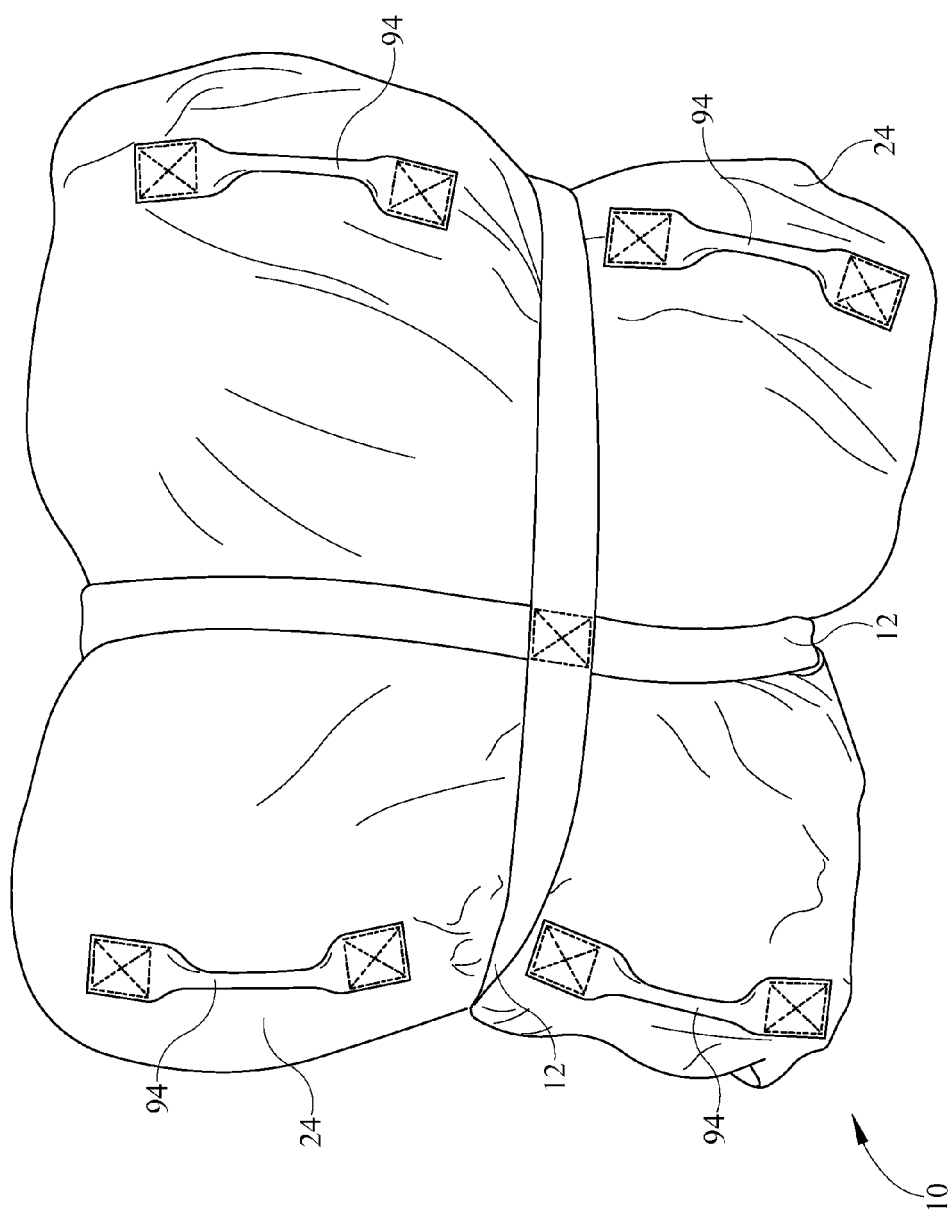
FIG. 9 is a rear perspective view of a fully stowed cargo netting system in accordance with one embodiment of the present invention.

Finally, referring now to FIGS. 8 and 9 there is depicted a fully stored system 10, wherein storage bags 24 containing single piece net 20 and concomitant ratchets 90 are folded over center section 30 and secured in place by a pair of cinch straps 12 to prevent storage bags 24 from unfolding. Additonally, the bottom side of storage bag 24 and center section 30 may comprise a plurality of handles 94 sewn or otherwise secured thereto to aid the user in carrying and positioning the invention 10 over cargo. Handles 94 may be oriented in a variety of positions without departing from the scope of the invention.

Thus the present invention 10 provides a cargo net system 10 that is simple to store and is readily deployed and secured by virtue of its novel construction and easy orientation over cargo 1.

The foregoing detailed description of the embodiments of the invention is presented primarily for clearness of understanding and no unnecessary limitations are to be understood or implied therefrom. Modifications to the present invention in its various embodiments will become obvious to those skilled in the art upon reading this disclosure and may be made without departing from scope of the invention and the claims appended hereto.

We claim:

1. A system for securing a cargo comprising:
   a single piece cargo net having a semi-rigid center section for centering said cargo net, said single piece cargo net comprising:
   a pair of opposed short side sections having a plurality of spaced vertical straps extending from said center section, said vertical straps having terminal ends;
   a pair of opposed long side sections having a plurality of spaced vertical straps extending from said center section, said vertical straps having terminal ends;
   a plurality of spaced horizontal straps having terminal ends, said horizontal straps movably secured to said spaced vertical straps of said short and long side sections at a first plurality of points, and fixedly secured to said spaced vertical straps of said short and long side sections at a second plurality of points;
   a plurality of fasteners secured to the terminal ends of said plurality of spaced horizontal straps for tightening said horizontal straps around said cargo; and
   a plurality of fasteners secured to terminal ends of said plurality of spaced vertical straps for tightening said vertical straps around said cargo.

2. A system for securing a cargo container to a shipping platform as claimed in claim 1 comprising:
   a first pair of opposed bags for containing said pair of opposed short side sections;

a second pair of opposed bags for containing said pair of opposed long side sections; and wherein said first and second pair of opposed bags are secured to said center section for storage of said cargo net.

3. A system for securing a cargo container to a shipping platform as claimed in claim 2 wherein said first and second pair of opposed bags each have a pair of opposed channels at an upper portion thereof through which said horizontal straps are routed.

4. A system for securing a cargo container to a shipping platform as claimed in claim 2 comprising:
- a first bag half for containing said pair of opposed short side sections, said first bag half secured to said center section;
- a second bag half for containing said pair of opposed long side sections; said second bag half secured to said center section, and
- wherein said first and second bag halves form bags for storage of said cargo net.

5. A system for securing a cargo container to a shipping platform as claimed in claim 1 wherein said center section is secured to said plurality of spaced vertical straps at a third plurality of points.

6. A system for securing a cargo container to a shipping platform as claimed in claim 1 wherein said center section is a plexi-glass material.

7. A system for securing a cargo container to a shipping platform as claimed in claim 1 wherein said center section is a plastic material.

8. A system for securing a cargo container to a shipping platform as claimed in claim 1 wherein said center section is centered on a top of said cargo for centering said cargo net around said cargo.

9. A system for securing a cargo container to a shipping platform as claimed in claim 1 comprising:
- a plurality of handles secured to a side of said center section for lifting and placing said system.

* * * * *